April 17, 1956 S. A. PROCTER 2,742,591
TELEVISION SWEEP CIRCUIT
Filed July 18, 1952
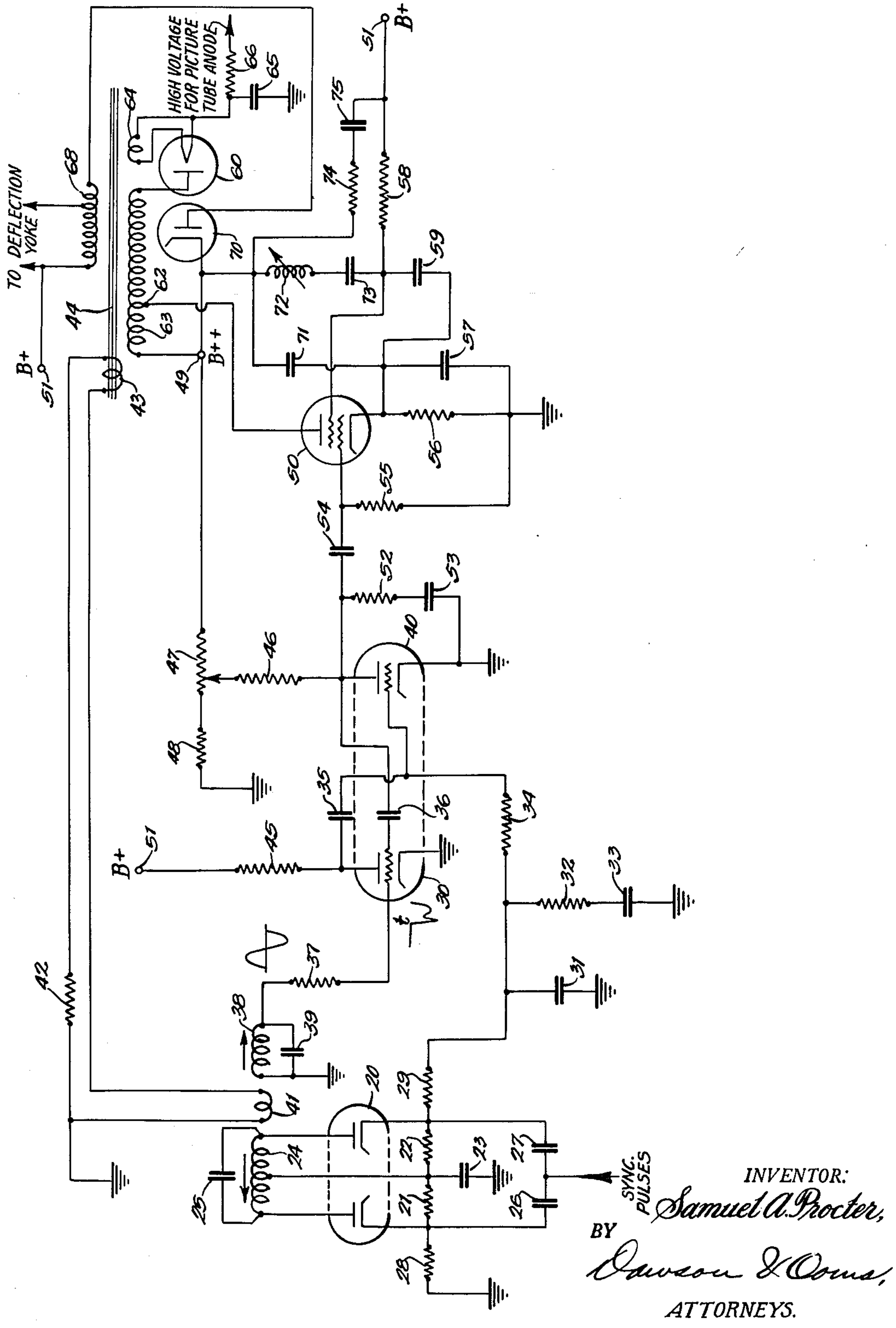
INVENTOR:
Samuel A. Procter,
BY
Dawson & Ooms,
ATTORNEYS.

2,742,591
Patented Apr. 17, 1956

2,742,591

TELEVISION SWEEP CIRCUIT

Samuel A. Procter, Chicago, Ill.

Application July 18, 1952, Serial No. 299,532
6 Claims. (Cl. 315—27)

This invention relates to synchronized sweep circuits, particularly circuits adapted for generating the sawtooth current employed for horizontal cathode ray deflection in the picture tubes of television receivers.

In conventional American television receivers, the cathode ray is deflected horizontally at a frequency of 15,750 cycles per second. The control signal for the horizontal sweep is provided as part of the television signal itself, the picture carrier being modulated by synchronizing pulses at the rate of 15,750 pulses per second.

Local generation of the sawtooth current in the television receiver is usually accomplished in a vacuum-tube oscillator whose frequency is in some suitable manner controlled by the synchronizing pulses transmitted from the television station.

Two principal systems of oscillator synchronization are used. One system involves direct triggering of the oscillator by the individual synchronizing pulses. That arrangement is simple and is almost universally used in lower priced sets. It has the serious disadvantage, however, that the oscillator can be triggered by any random noise pulse of amplitude comparable to that of the synchronizing pulses. This sensitivity to noise pulses causes directly synchronized receivers to "lose sync" repeatedly in the presence of strong random noise, such as the electrical noise caused by lightning, engine ignition systems, etc.

The other, more satisfactory system of sweep synchronization is the so-called "automatic frequency control" circuit. In that circuit, the frequency of the sweep oscillator is governed by the average frequency of the synchronizing pulses. In other words, it is insensitive to individual noise pulses and will change its frequency only when the average value of the synchronizing-pulse frequency changes.

The "automatic frequency control" or AFC sweep system is functionally far superior to the directly synchronized circuits, but it is used only in expensive television receivers because of its complexity. The conventional AFC system uses an oscillator, a reactance tube shunted across the oscillator tuned circuit, a D.-C. amplifier, a frequency-sensitive discriminator, and a "limiter" or "clipper" amplifier.

The principal object of the present invention is to provide an AFC horizontal-sweep circuit employing in combination a novel voltage-doubling discriminator circuit and a voltage-controlled multivibrator, the frequency of which is under the direct control of the voltage generated in the discriminator. By this combination of novel elements, I achieve a simple AFC sweep circuit, substantially no more expensive than the directly synchronized sweep circuits but as stable and insensitive to noise as the conventional expensive AFC circuit.

In addition to the principal object just stated, my invention has as secondary objects the provision of a simplified size control circuit and an improved horizontal linearity circuit, both of which are made possible by the novel and improved operation of my sweep circuit proper.

In the drawing which accompanies this specification, I have shown schematically an illustrative circuit embodying my invention; the single figure of the drawing shows only those parts of a television receiver more or less directly involved in the sweep-generating and synchronizing circuit. It will be understood that the other portions of the receiver may be conventional.

My shunt-fed discriminator is built around vacuum tube 20, which may be a duo-diode such as the 6AL5. The cathodes of the respective diode units of tube 20 are connected together through a series circuit comprising resistors 21 and 22; these resistors should be of the same ohmic value and may be about 270,000 ohms. The junction of resistors 21 and 22 is by-passed to ground through capacitor 23, which may be of the order of .001 mf. The junction of resistors 21 and 22 is also connected to the midpoint of discriminator inductor 24, which is a center-tapped coil, preferably provided with an adjustable slug or other means for varying its inductance. Coil 24 is shunted by a capacitor 25, which may be of the order of .01 mf. for the conventional installation.

The tank circuit comprising capacitor 25 and coil 24 is designed to have a tuning range embracing the horizontal-sweep frequency of 15,750 cycles, in installations designed for use with the regular American television standards. One terminal of coil 24 is connected to one of the plates of tube 20, and the other terminal of coil 24 is connected to the other plate of tube 20.

The synchronizing pulses derived from the sync separator circuit are applied simultaneously to the two cathodes of tube 20, through coupling capacitors 26 and 27. In a typical installation, those capacitors may be of the order of 500 mmf. The capacitance is not critical but the two capacitors should have substantially the same capacitance.

The left-hand cathode of tube 20 is connected to ground through resistor 28, which may, in a typical installation, be of the order of 100,000 ohms. The other cathode of tube 20 is connected to ground through a series circuit comprising resistor 29 and by-pass capacitor 31. Resistor 29 should be substantially similar to resistor 28, and capacitor 31 may be of suitable size to provide a low-impedance path for 15.75 kc. currents.

Capacitor 31 is shunted by an additional by-pass circuit comprising resistor 32 and capacitor 33 in series. Resistor 32 may be of the order of 20,000 ohms, while capacitor 33 is a rather large capacitor of perhaps .25 to .5 mf.

The junction of resistor 29 and capacitor 31 is connected to the grid of tube 40 through resistor 34, which may be about 100,000 ohms. The grid of tube 40 is also coupled to the plate of tube 30 by capacitor 35, which is a small capacitor of perhaps 15 mmf.

Tubes 30 and 40 may be the respective halves of a dual-triode tube such as a 6SL7.

The cathodes of both tubes 30 and 40 are grounded. The grid of tube 30 is coupled to the plate of tube 40 by means of capacitor 36, which may be about 50 mmf. The grid of tube 30 is also connected through resistor 37 to one side of coil 38. Resistor 37 may be about 100,000 ohms. Coil 38 is preferably provided with means for varying its inductance for tuning purposes, and it is shunted by capacitor 39, which may be about .01 mf. The tank circuit 38, 39 should be designed to be capable of resonance at the 15.75 kc. horizontal-sweep frequency. The terminal of coil 38 remote from resistor 37 is grounded.

A link 41 is coupled inductively to both coil 24 and coil 38, and it, in turn, is coupled through resistor 42 (about 5 ohms) to a link 43 on the core of horizontal output transformer 44. One side of link 41 is grounded.

The plate of tube 30 is connected to a suitable positive voltage source through plate-load resistor 45, which may be about 35,000 ohms. The plate of tube 40 is connected through load resistor 46 to the movable arm of potentiometer 47. Resistor 46 may be about 200,000 ohms. One terminal of potentiometer 47 is connected to ground through resistor 48, which may be about 220,000 ohms. The other terminal of potentiometer 47 is connected to the terminal 49 which is marked "B++." As will be more fully explained in a subsequent paragraph, terminal 49 is a point substantially more positive than the positive terminal 51, marked "B+." Potentiometer 47 may have a maximum resistance of perhaps 250,000 ohms.

The plate of tube 40 is connected to ground through a resistance-capacitance series circuit comprising resistor 52 and capacitor 53. Resistor 52 may have a resistance of about 5,000 ohms and capacitor 53 may be of the order of 50 to 220 mmf.

The plate of tube 40 is connected to the grid of tube 50 through coupling capacitor 54, which may be about .01 mf. The grid of tube 50 is connected to ground through grid resistor 55, which may be of the order of $\frac{5}{10}$ megohm.

The cathode of tube 50 is connected to ground through biasing resistor 56, shunted by by-pass capacitor 57. Resistor 56 may have a value of about 100 ohms, while capacitor 57 may be about .05 mf.

Tube 50 may be any tube suitable for operation as a horizontal output tube, such as a 6BG6. The screen of tube 50 is connected to B+ terminal 51 through resistor 58, which may have a value of about 15,000 ohms. It is also by-passed to the cathode of tube 50 by capacitor 59, which may have a value of about .02 mf. The plate of tube 50 is connected to tap 62 on the high-voltage auto-transformer winding 63 of horizontal output transformer 44. One terminal of winding 63 is connected to B++ terminal 49, while the opposite terminal is connected to the plate of high-voltage rectifier diode 60. The filament of diode 60 is connected to filament winding 64 on the core of transformer 44, and is also connected to ground through filter capacitor 65. The high voltage for the picture-tube beam-accelerating anode is taken from across capacitor 65 through filter resistor 66.

This circuit arrangement for supplying accelerating-anode voltage is conventional and does not form a part of this invention.

Damper diode 70 performs its usual function, its cathode being connected to the B++ terminal 49 and its plate being connected to one terminal of the output coil 68, from which the horizontal deflection coil of the picture-tube is driven. The other terminal of coil 68 is connected to B+ terminal 51. The damper and yoke-deflection arrangement just described is also conventional.

The cathode of damper tube 70 is connected through capacitor 71 to the cathode of tube 50; capacitor 71 is a harmonic-suppressing element which may have a value of about .05 mf. The cathode of tube 70 is also connected to the screen of tube 50 through a series circuit comprising variable inductor 72 and capacitor 73. Inductor 72 and capacitor 73 are designed to be capable of resonance at the horizontal-sweep frequency of 15.75 kc. The damper output voltage is filtered by the filter comprising resistor 74, which may be about 200 ohms, and capacitor 75, which will normally be a large capacitor having a value of 8 mf. or more.

The B++ terminal 49 is positive by a voltage substantially equal to the B+ voltage plus the damper tube output voltage. This arrangement is conventional and is not part of my invention.

It is to be understood that the various component values which I have given for the circuit of the drawing are illustrative only and are not to be regarded as in any sense a limitation on my invention.

*Operation*

The operation of my invention will perhaps be most easily understood if I first give a general qualitative description without specific reference to the various circuit elements. After such a description, I shall then give a more detailed review of the operation with emphasis on the functions of the various parts themselves.

Tubes 30 and 40, in conjunction with amplifier tube 50, transformer 44, and the feedback loop comprising links 41 and 43 form a stable self-excited oscillator. The frequency-determining elements of the oscillator are confined to tubes 30 and 40 and their associated circuit elements, amplifier tube 50 and transformer 44 being non-resonant and involved only in the sense that they provide a portion of the path for the feedback of energy from the output of tube 40 to the input of tube 30.

The natural frequency of the oscillator just described is controlled in the coarse sense by tank circuit 38, 39. Fine variation in the oscillator frequency is accomplished by variation of the D.-C. bias on the grid of tube 40.

The voltage generated by the self-excited oscillator comprising tubes 30 and 40 is compared with the synchronizing pulses from the incoming television signal in the discriminator circuit which comprises tube 20. Any difference between the frequency of the local oscillator 30, 40 and the frequency of the incoming synchronizing pulses is reflected in a change in the D.-C. discriminator output voltage across capacitor 31. That voltage, applied to the grid of tube 40, immediately produces sufficient shift in the frequency of the local oscillator to make it match exactly the frequency of the synchronizing pulses.

Since any deviation in frequency between the sync pulses and the horizontal-sweep oscillator must endure for several cycles in order to produce a difference in the D.-C. output voltage from discriminator 20, the circuit is unresponsive to momentary frequency changes caused by noise pulses and other random phenomena. Thus it is fully as stable in performance as the most expensive sine-wave AFC sweep circuit using a reactance tube.

At the same time, the extremely stable frequency control provided by my invention, coupled with the fact that the output wave form is not affected by changes in the plate supply voltage of the tube 40, permits me to employ potentiometer 47 as a horizontal size control, instead of the adjustable absorption circuit usually associated with the horizontal output transformer for that purpose.

As a further advantage of my invention, I can use, as a horizontal linearity control, the negative-feedback circuit comprising coil 72 and capacitor 73, by which a greater or lesser amount of horizontal-sweep frequency voltage may be applied to the screen of amplifier tube 50 for obtaining optimum sweep linearity.

Reviewing in greater detail the operation of my circuit, I shall first consider the behavior of the horizontal-sweep oscillator which comprises tubes 30 and 40 in combination with the feedback path which includes amplifier tube 50 and output transformer 44.

The sawtooth current in the windings of transformer 44 induces a similar current in link 41 which, in turn, by induction produces circulating energy in tank circuit 38, 39.

Because of the harmonic-suppressing characteristics of the high Q tank circuit 38, 39, the voltage across coil 38 is substantially sinusoidal in wave form. That voltage, applied to the grid of tube 30 through clipping resistor 37, is clipped on its positive half-cycle.

During the positive half-cycle of the grid voltage applied to tube 30, tube 30 conducts and its plate voltage is low. At the beginning of the negative half-cycle of grid voltage, however, the plate voltage of tube 30 starts to rise, and that rising voltage is differentiated by the small capacitor 35 and is applied as a positive pulse to the grid of tube 40. When the oscillator is perfectly synchronized with the incoming sync pulses, tube 40 will conduct almost immediately after its grid voltage starts to rise, and the resulting drop in plate voltage of tube 40 is transmitted back to the grid of tube 30 through small coupling condenser 36. This regenerative action produces a very rapid drop in the grid voltage of tube 30, as is evidenced by the spike on the wave form sketched opposite the grid of tube 30.

During the negative "spike" on the grid voltage of tube 30, tube 40 is conducting at saturation and its plate voltage drops very rapidly to a low value, capacitor 53 discharging quickly through the low resistance of tube 40. Presently, when the plate voltage of tube 40 has dropped to a low value—perhaps 15 or 20 volts—tube 40 ceases to conduct, since the positive impulse on its grid disappears as a result of the charging of capacitor 35. When capacitor 35 has charged to the new, higher plate voltage of tube 30, the grid of tube 40 returns to its static bias which is governed by the output voltage of discriminator 20, to be described more fully presently. In a typical case, that voltage may be from 6 to 10 volts minus. With such a negative grid bias, and a plate voltage of only a few volts, tube 40 of course ceases to conduct. At once, capacitor 53 starts to charge, and the plate voltage of tube 40 begins slowly to increase.

Meanwhile the negative half-cycle of grid voltage on tube 30 runs its course, as the wave form on the drawing indicates. During the positive half of the following cycle, tube 30 conducts, but that change does not cause tube 40 to conduct, since the brief negative pulse on the grid of tube 40 caused by conduction of tube 30 merely adds to the D.-C. bias which is already sufficient to hold tube 40 in a non-conducting state. Since capacitor 35 is a very small one, that negative pulse if of brief duration, and the grid voltage of tube 40 is at the D.-C. bias level throughout nearly all of the half-cycle of voltage on the grid of tube 30.

Throughout most of the negative half-cycle and all of the positive half-cycle of grid voltage on tube 30, the voltage on the plate of tube 40 will have been rising linearly, as capacitor 53 charges. When the oscillator is perfectly synchronized with the sync pulses, the plate voltage on tube 40 rises just sufficiently to cause the tube to conduct at the instant tube 40 receives a positive pulse on its grid at the time *t* indicated on the wave form at the grid of tube 30.

The foregoing description of a single cycle of operation will make it clear to a reader skilled in the art that the voltage on the plate of tube 40 undergoes a systematic sawtooth pattern having a linear rise characteristic and a very rapid drop, equal in frequency to the frequency of the sine-wave voltage developed across coil 38. The sawtooth voltage at the plate of tube 40 is applied to the grid of amplifier tube 50 and is converted, in conventional manner, to a sawtooth current in coil 68, used to deflect the beam of a picture-tube. At the same time some of the sawtooth energy is fed back through link 41 to maintain oscillation in coil 38, so that the system as a whole forms a stable, self-excited oscillator.

I shall now describe the operation of my shunt-fed discriminator which embodies tube 20.

The sync pulses from the television signal, comprising a train of short, rectangular, negative-going pulses, are fed to the cathodes of the right- and left-hand diodes in tube 20. At the same time, the plates of the tube diodes are fed in opposite phase by sine-wave voltage induced in coil 24 by the circulating energy in link 41.

If the phase relation between the sync pulses and the sine-wave voltages applied to the plates of the diodes is such that the average potential on one plate during each sync pulse equals that on the other plate, then the net control voltage output of the discriminator will be zero. If, however, the phase of the sine-wave relative to the pulse train shifts, a control voltage equal to the average plate-to-plate potential difference during the pulse will be developed across capacitors 26 and 27, and hence across resistors 21 and 22. This voltage, filtered of its variational components, appears as a D.-C. biasing potential across capacitor 31, from which it is applied to the grid of tube 40.

In operation, the phase relation between the pulse train and the sine-wave voltage rapidly stabilizes at a point whereat the correct bias voltage is applied to tube 40 to maintain the frequency of oscillation of the horizontal-sweep oscillator identical to that of the pulse train. Any shift in the frequency of the pulse train causes a phase shift between the pulse train and the sine-wave voltage which will change the developed bias on the grid of tube 40 sufficiently to restore a new condition of stable equilibrium.

Because of the large voltage developed by my discriminator responsively to very small shifts in phase, this circuit is astonishingly stable. The horizontal-sweep voltage will remain "locked in" with the pulse train despite large changes in the frequency of the pulse train or despite extensive changes in the circuit constants of the oscillator.

As a result, it is possible for me to control picture size by the use of potentiometer 47, changing the impedance of the plate circuit of tube 40 and changing also the plate-supply voltage of that tube. The wave form is an excellent sawtooth, regardless of the position of the tap on potentiometer 47, and the picture size can be varied within large limits without disturbing synchronization.

Thus, I am able to achieve far better and more stable control of picture size than with conventional horizontal-sweep circuits, in which even a small change in the oscillator circuit constants will cause loss of "sync."

The manner in which variation of the bias on tube 40 controls the oscillator frequency is as follows: The plate voltage of tube 40 is very low following one of the brief intervals in which tube 40 conducts. It starts to rise linearly thereafter, as capacitor 53 charges. During the cut-off period of tube 40, its grid voltage is equal to the D.-C. bias supplied from the discriminator. (A negative "spike" drives the grid of tube 40 more negative than the bias voltage for a few microseconds at the instant tube 30 starts to conduct, half-way through the sawtooth cycle. That pulse is of very short duration, however, and does not figure in the operation of the circuit.) The D.-C. bias at the grid of tube 40 is more than sufficient to cut it off for all low values of plate voltage. Therefore, the instant at which tube 40 will again be able to conduct will depend upon the magnitude of the D.-C. bias. At time *t*, when the grid of tube 30 starts to go negative, the voltage on the grid of tube 40 starts to rise. No rapid rise, however, will occur so long as tube 40 is not conducting. Obviously, therefore, the magnitude of the bias voltage will govern the precise instant at which the rising grid voltage on tube 40 causes the tube to conduct and thus initiate a multivibrator cycle, discharging condenser 53. If the D.-C. bias on tube 40 is made more negative, the trigger action is delayed, while if it be made less negative, the "trigger" action will be caused to occur sooner in each cycle. Thus the bias on tube 40 provides a very sensitive control of the frequency, within sufficiently wide limits to keep the horizontal-sweep oscillator in perfect step with the sync-pulse train.

My sweep system, it will be understood, is not sensitive, however, to random noise pulses, since random noise pulses will not alter the average charge on capacitor 31.

I have disclosed in the present circuit another useful and novel feature comprising the use of coil 72 as a horizontal linearity control. As may be seen from the drawing, the screen voltage on tube 50 is normally taken from B+ supply 51 through dropping resistor 58. By means, however, of the series resonant circuit 72, 73, I have provided a means of applying to the screen of tube 50 an alternating component of voltage fed back from the plate circuit of tube 50. The phase of the voltage fed back to the screen of tube 50 may be controlled by adjusting the coil 72, and by that means the amplification characteristic of the tube 50 may be adjusted to compensate for any imperfections in the transformer 44 or other circuit elements tending to introduce distortion into the output wave form.

In this specification I have disclosed my novel circuits in combination, as they would normally be used in the horizontal-sweep circuit of a television receiver. It should be understood, however, that my voltage-controlled sawtooth generator may be used with a conventional discriminator circuit if desired or may even be used in applications wherein the variable frequency-controlling bias voltage is obtained from some source other than a discriminator circuit.

Similarly, the advantages of my shunt-fed symmetrical discriminator are not limited entirely to the application shown in the drawing but, on the contrary, may be used independently in appropriate applications.

While I have in this specification described in considerable detail a single embodiment of my invention, it is to be understood that it is illustrative only, and that the scope of my invention is to be determined primarily with reference to the appended claims.

I claim:

1. In a television receiver, a sweep circuit for deflection of a cathode-ray tube, comprising a discriminator having a pair of input means, circuit means connected to one of said input means for applying thereto synchronizing pulses derived from a received television signal, second circuit means comprising a narrow-band-pass filter connected to the other of said input means, said discriminator being operative to derive a unidirectional control voltage controlled in magnitude by the phase relation of the voltage applied to said respective input means, a pulse-responsive sawtooth-wave generator comprising an electron tube having a cathode, a grid, and a plate, means applying said control voltage from the discriminator between said grid and said cathode as a bias voltage, output means coupling said plate to said cathode-ray tube for deflection of the beam thereof, and feedback means coupling said output means to said grid, said feedback means comprising a narrow-band-pass filter and a differentiator means operative to supply to said grid a train of short-duration pulses for triggering said sawtooth generator, said feedback means being also coupled to said second circuit means for supplying energy thereto, the duration of the cycle of the sawtooth wave developed by said generator responsively to one of said short-duration pulses being in part dependent on the coincident magnitude of said control voltage.

2. In a television receiver, a sweep circuit for deflection of a cathode-ray tube, comprising a self-excited sawtooth-wave generator having an electron tube containing a cathode, a plate, and a grid, a capacitor being connected between said plate and said cathode, said self-excited generator comprising also a feedback circuit coupling said plate and said grid, energy-transfer means coupled to said feedback circuit and operative to derive therefrom a substantially sinusoidal voltage having the same frequency as the sawtooth wave, said energy-transfer means having two outputs substantially balanced relative to ground, a discriminator comprising a pair of diode rectifiers, means coupling one of said outputs to one electrode of one rectifier and the other of said ouptuts to the corresponding electrode of the other rectifier in push-pull arrangement, circuit means for applying a train of synchronizing pulses derived from a received television signal to the other electrodes of said rectifiers in parallel, load impedance means connected in circuit with said rectifiers for deriving a D.-C. voltage therefrom, and circuit means applying said control voltage to the grid of said electron tube as a bias for controlling the frequency of said sawtooth wave.

3. In a television receiver, a sweep circuit for deflection of a cathode-ray tube, comprising a discriminator having a pair of input means, circuit means connected to one of said input means for applying thereto synchronizing pulses derived from a received television signal, said discriminator being operative to derive a unidirectional control voltage controlled in magnitude by the phase relation of the voltages applied to said respective input means, a pulse-responsive sawtooth-wave generator comprising an electron tube having a cathode, a grid, and a plate, means applying said control voltage from the discriminator between said grid and said cathode as a bias voltage, output means coupling said plate to said cathode-ray tube for deflection of the beam thereof, feedback means coupling said output means to said grid, said feedback means comprising a differentiator means operative to supply to said grid a train of short-duration pulses for triggering said sawtooth generator, and energy-transfer means connected between said feedback means and said other input means for supplying to said other input means an A.-C. voltage equal in frequency to said sawtooth wave, the duration of the cycle of said sawtooth wave developed by said generator responsively to one of said short-duration pulses being in part dependent upon the coincident magnitude of said control voltage.

4. Apparatus according to claim 2 wherein said electron tube is provided with a plate load impedance variable within predetermined limits for varying the amplitude of the sawtooth wave generated by said generator.

5. In a television receiver having a horizontal-deflection sweep transformer and an amplifier driving the same, said amplifier comprising a screen-grid tube, a horizontal linearity control comprising a series inductance-capacitance circuit coupled to said screen grid, one of said inductance and capacitance elements being variable to permit adjustment of the resonant frequency of said circuit to any desired frequency within a band which includes the horizontal-deflection sweep frequency.

6. Apparatus according to claim 3 wherein said output means coupling said plate to said cathode-ray tube comprises a screen-grid tube and a circuit associated therewith comprising an inductive element and a capacitive element in series providing an A.-C. path between said screen grid and ground, one of said last-mentioned elements being variable to permit adjustment of the resonant frequency defined by said elements to any desired frequency within a band which includes the frequency of said synchronizing pulses.

References Cited in the file of this patent

UNITED STATES PATENTS

| | | |
|---|---|---|
| 2,370,426 | Schade | Feb. 27, 1945 |
| 2,492,090 | Bass | Dec. 20, 1949 |
| 2,553,165 | Bliss | May 15, 1951 |
| 2,564,471 | Eaton | Aug. 14, 1951 |
| 2,577,795 | Mohr | Dec. 11, 1951 |
| 2,610,298 | Zalondek | Sept. 9, 1952 |
| 2,623,177 | Hugenholtz | Dec. 23, 1952 |
| 2,652,489 | Robinson | Sept. 15, 1953 |
| 2,654,855 | Denton | Oct. 6, 1953 |
| 2,685,033 | Volz | July 27, 1954 |
| 2,686,276 | Anderson | Aug. 10, 1954 |